(12) United States Patent  (10) Patent No.: US 8,315,036 B2
Ogawa et al.  (45) Date of Patent: Nov. 20, 2012

(54) CERAMIC ELECTRONIC COMPONENT AND METHOD FOR MANUFACTURING THE SAME

(75) Inventors: Makoto Ogawa, Fukui (JP); Akihiro Motoki, Fukui (JP); Junichi Saito, Fukui (JP); Shunsuke Takeuchi, Echizen (JP); Kenichi Kawasaki, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 540 days.

(21) Appl. No.: 12/405,399

(22) Filed: Mar. 17, 2009

(65) Prior Publication Data

US 2009/0303655 A1  Dec. 10, 2009

(30) Foreign Application Priority Data

Jun. 10, 2008 (JP) ................. 2008-151785

(51) Int. Cl.
*H01G 4/00* (2006.01)
(52) U.S. Cl. ............... 361/321.1; 361/322; 361/321.3; 361/320; 361/301.1; 361/303; 205/87
(58) Field of Classification Search ........... 361/298.2, 361/301.1, 303, 322, 321.3, 321.2, 321.1, 361/320
See application file for complete search history.

(56) References Cited

U.S. PATENT DOCUMENTS

| | | | |
|---|---|---|---|
| 5,839,188 A * | 11/1998 | Pommer | 29/830 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2008/0225462 A1 | 9/2008 | Motoki et al. | |

FOREIGN PATENT DOCUMENTS

| | | |
|---|---|---|
| JP | 63-169014 A | 7/1988 |
| JP | 05-343259 A | 12/1993 |
| JP | 06-346292 A | 12/1994 |

(Continued)

OTHER PUBLICATIONS

Iwanaga et al.; "Multilayer Ceramic Electronic Component and Method for Producing Same"; U.S. Appl. No. 12/405,372, filed Mar. 17, 2009.

(Continued)

*Primary Examiner* — Jayprakash N Gandhi
*Assistant Examiner* — Hung Dang
(74) *Attorney, Agent, or Firm* — Keating & Bennett, LLP

(57) ABSTRACT

A ceramic electronic component includes a ceramic body and a plurality of external electrodes disposed at a surface of the ceramic body. The external electrodes include a plating layer containing glass particles each coated with a metal film. The plating layer is formed by co-deposition of a plating metal and the metal-coated glass particles.

6 Claims, 3 Drawing Sheets

FOREIGN PATENT DOCUMENTS

| | | |
|---|---|---|
| JP | 2000-285733 A | 10/2000 |
| JP | 3247767 B2 | 1/2002 |
| JP | 2002-093866 A | 3/2002 |
| WO | 2008/062602 A1 | 5/2008 |

OTHER PUBLICATIONS

Iwanaga et al.; "Monolithic Ceramic Electronic Component and Method for Manufacturing the Same"; U.S. Appl. No. 12/405,370, filed Mar. 17, 2009.

Ogawa et al.; "Monolithic Ceramic Electronic Component and Method of Manufacturing Monolithic Ceramic Electronic Component"; U.S. Appl. No. 12/405,405, filed Mar. 17, 2009.

Ogawa et al.; "Ceramic Electronic Component and Method for Manfacturing the Same"; U.S. Appl. No. 12/356,561, filed Jan. 21, 2009.

Official Communication issued in corresponding Japanese Patent Application No. 2008-151785, mailed on Jul. 3, 2012.

* cited by examiner

US 8,315,036 B2

CERAMIC ELECTRONIC COMPONENT AND METHOD FOR MANUFACTURING THE SAME

BACKGROUND OF THE INVENTION

1. Field of the Invention

The present invention relates to a ceramic electronic component and a method for manufacturing the same, and specifically to an external electrode of the ceramic electronic component and a process for forming the external electrode by plating.

2. Description of the Related Art

A monolithic ceramic capacitor, which is known as a representative of ceramic electronic components, includes a multilayer composite including a stack of a plurality of dielectric ceramic layers and a plurality of internal electrodes extending along interfaces between the dielectric ceramic layers, and a plurality of external electrodes each electrically connecting the internal electrodes exposed at a surface of the multilayer composite. Such a known monolithic ceramic capacitor is shown in FIG. 3.

Referring to FIG. 3, the external electrodes are each formed on a surface of the multilayer composite 102 at which the internal electrodes 104 or 105 are exposed, thus electrically connecting the internal electrodes 104 or 105. In order to form the external electrodes, in general, a metal paste containing a metal component and a glass component is applied onto the surfaces at which the internal electrodes are exposed. The coatings of the metal paste are fired, thus forming paste electrode layers 106 and 107.

Then, Ni-based first plating layers 108 and 109 are formed over the surfaces of the paste electrode layers 106 and 107, respectively, and then Sn-based second plating layers 110 and 111 are formed over the surfaces of the respective first plating layers 108 and 109. Hence, the external electrode has a three-layer structure including the paste electrode layer, the first plating layer, and the second plating layer.

The external electrode requires high solder wettability when the monolithic ceramic capacitor is mounted on a substrate with solder. In addition, the external electrode is intended to electrically connect the electrically isolated internal electrodes to each other. The Sn-based second plating layers 110 and 111 ensure sufficient solder wettability, and the paste electrode layers 106 and 107 electrically connect the internal electrodes to each other. The first plating layers 108 and 109 act as the respective underlayers of the second plating layers 110 and 111 to prevent the corrosion by solder used for mounting.

Unfortunately, the paste electrode layers 106 and 107 have a thickness as large as several tens micrometers to several hundred micrometers. In order for the monolithic ceramic capacitor to satisfy certain dimensional specifications, the effective volume of the paste electrode layer must be reduced to ensure a sufficient capacitance while the volume of the paste electrode layer is maintained. On the other hand, plating layers generally have thicknesses as small as several micrometers. If the external electrode can be composed of only the first plating layer and the second plating layer, a larger effective volume can be achieved.

For example, in a multilayer composite disclosed in Japanese Unexamined Patent Application Publication No. 63-169014, electroconductive metal layers are formed by electroless plating over the respective entire side surfaces at which the internal electrodes are exposed, and thus short-circuit the internal electrode layers exposed at the respective surfaces. However, the electroconductive metal layer formed by electroless plating does not have sufficient adhesion to the side surfaces. This may cause a problem with reliability.

In Japanese Unexamined Patent Application Publication No. 05-343259, an external electrode having high adhesion is formed by coating a surface of a ceramic body with an electroless plating layer containing glass powder.

In the production process of this external electrode, however, a blister is liable to be formed at the surface of the plating layer by heat treatment performed after electroless plating, depending on the conditions of the heat treatment. The blister can cause moisture permeation to degrade the reliability, and besides degrades the appearance.

In addition, if the glass particles and the plating metal are co-deposited in this process, the glass is not sufficiently deposited undesirably. Also, the glass can undesirably be melted and lost in a plating bath.

SUMMARY OF THE INVENTION

Accordingly, preferred embodiments of the present invention provide a highly reliable ceramic electronic component having high effective volume and a method for manufacturing the same.

According to a preferred embodiment of the present invention, a ceramic electronic component includes a ceramic body and a plurality of external electrodes disposed on a surface of the ceramic body. Each external electrode includes a plating layer containing glass particles each coated with a metal film.

Preferably, the ceramic body is a multilayer composite including a stack of a plurality of ceramic layers, and a plurality of internal electrode layers extending respectively along the interfaces between the ceramic layers and exposed at a surface of the multilayer composite. The plating layer of the external electrode electrically connects the internal electrode layers to each other at the surface at which the internal electrode layers are exposed.

Preferably, the plating layer essentially contains Cu, and the metal film essentially contains Ni.

Another preferred embodiment of the present invention is also directed to a method for manufacturing a ceramic electronic component.

The method includes the steps of preparing a ceramic body, preparing metal-coated glass particles, each including a glass particle and a metal film coating the glass particle, preparing a plating bath containing a plating metal and the metal-coated glass particles dispersed therein, and forming a plating layer containing the metal-coated glass particles on the ceramic body in the plating bath.

Preferably, the ceramic body is a multilayer composite including a stack of a plurality of ceramic layers and a plurality of internal electrode layers extending respectively along the interfaces between the ceramic layers and each having an end exposed at a surface of the multilayer composite. In the step of forming the plating layer, the exposed ends of the internal electrode layers are respectively plated to deposit the plating metal in the plating bath, and the deposits of the plating metal on the ends of the internal electrodes are grown so as to be joined to each other, thereby forming the continuous plating layer.

Preferably, the method further includes the step of heat-treating the ceramic body at a temperature equal to or more than the softening point of the glass particles after forming the plating layer.

Since the external electrode is substantially composed of at least one plating layer, the ceramic electronic component can exhibit a high effective volume. The plating layer containing metal-coated glass particles can exhibit high adhesion and results in reduced blisters, thus achieving a reliable ceramic electronic component.

If the plating layer is formed on a surface of the multilayer composite at which internal electrodes are exposed, the glass component of the glass particles fills the interfaces between the ceramic layers and the internal electrode layers by heat treatment, and, thus, prevents liquid or moisture from permeating the multilayer composite through the interfaces. Thus, the resulting monolithic ceramic electronic component is highly reliable.

In the method for manufacturing the ceramic electronic component according to a preferred embodiment of the present invention, glass particles dispersed in the plating bath are coated with metal films. Consequently, the glass particles can be easily co-deposited with the plating metal. This helps the control of the content and the degree of dispersion of the glass particles in the plating layer. The metal film coating the glass particles hinders the glass particles from being melted in the plating bath and, thus, facilitates the control of the plating bath. In addition, the metal film of the glass particles prevents plating solution from being trapped in asperities of the glass particles and, thus, reduces the occurrence of blisters by heat treatment.

Furthermore, in the method for manufacturing the ceramic electronic component, the heat treatment performed at a temperature equal to or greater than the softening point of the glass particles after forming the plating layer further enhances the adhesion between the glass component and the ceramic body. Thus, a highly reliable ceramic electronic component can be achieved.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
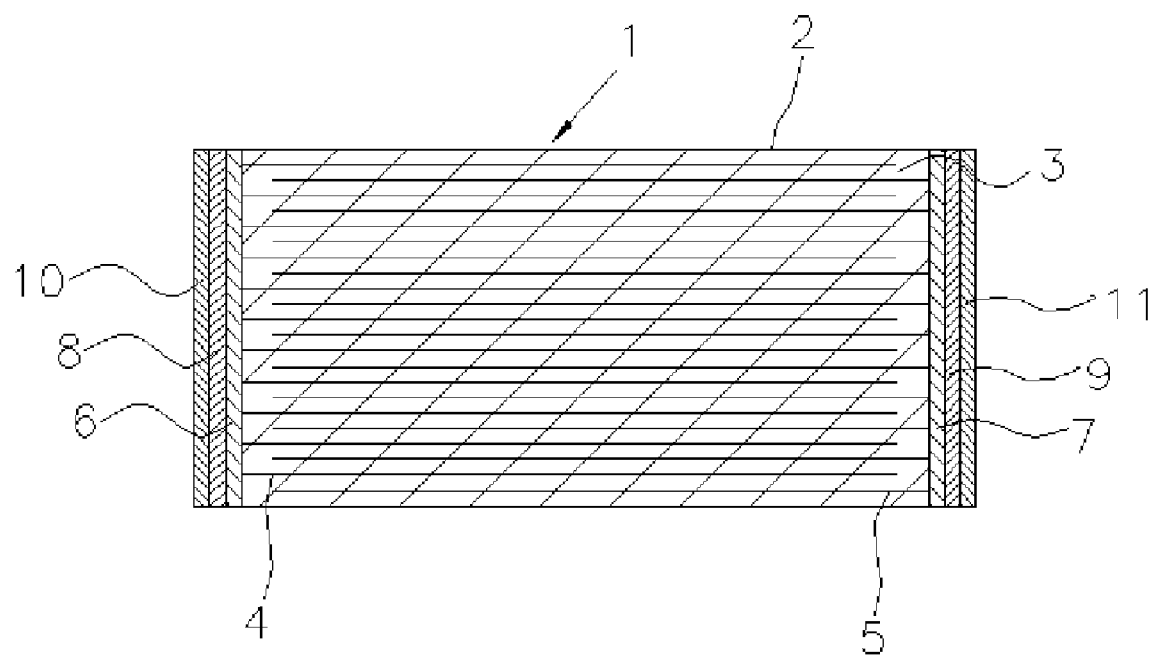
FIG. 1 is a sectional view of a monolithic ceramic capacitor, which is a type of ceramic electronic components, according to a preferred embodiment of the invention.

The external electrode of a ceramic electronic component according to preferred embodiments of the present invention is directly formed on a ceramic body, without disposing an underlayer, such as a paste electrode layer, a sputter electrode layer, or a vapor-deposited electrode layer. The plating layer contains glass particles coated with metal films. FIG. 1 shows a monolithic ceramic capacitor, which is a type of ceramic electronic components, according to one preferred embodiment of the invention.

The monolithic ceramic capacitor 1 shown in FIG. 1 includes a multilayer composite 2 including a stack of a plurality of dielectric ceramic layers 3 and a plurality of internal electrodes 4 and 5 extending respectively along interfaces between the dielectric ceramic layers and exposed at surfaces of the multilayer composite 2, and external electrodes, each electrically connecting the exposed internal electrodes 4 or 5 to each other.

For forming the external electrodes, first plating layers 6 and 7 containing the metal-coated particles are respectively formed on the surfaces at which the internal electrodes 4 or 5 are exposed. Subsequently, solder corrosion-resistant second plating layers 8 and 9 are formed on the first plating layers 6 and 7, respectively, if necessary. Then, third plating layers 10 and 11 are respectively formed to ensure solder wettability, if necessary. The second plating layers 8 and 9 and the third plating layers 10 and 11 may not contain metal-coated glass particles. FIG. 1 does not show the metal-coated glass particles in the first plating layers 6 and 7. Although the external electrode shown in FIG. 1 preferably has a three layer structure including the first plating layer 6 or 7, the second plating layer 8 or 9, and the third plating layer 10 or 11, such a three layer structure is not necessarily required as long as the object of the invention can be achieved.

Preferably, the third plating layers 10 and 11 shown in FIG. 1 are mainly made of Sn or Au because the third plating layers 10 and 11 require high solder wettability. Preferably, the second plating layers 8 and 9 are mainly made of Ni or the like because the second plating layers 8 and 9 are intended for underlayers preventing solder corrosion. The first plating layer can be made of any material without particular limitation, but is preferably made of mainly Cu from the viewpoint of adhesion to the ceramic body.

The first to third plating layers may be formed by electrolytic plating performed by electrifying, or electroless plating performed using a reducing agent, for example.

Figure 2:
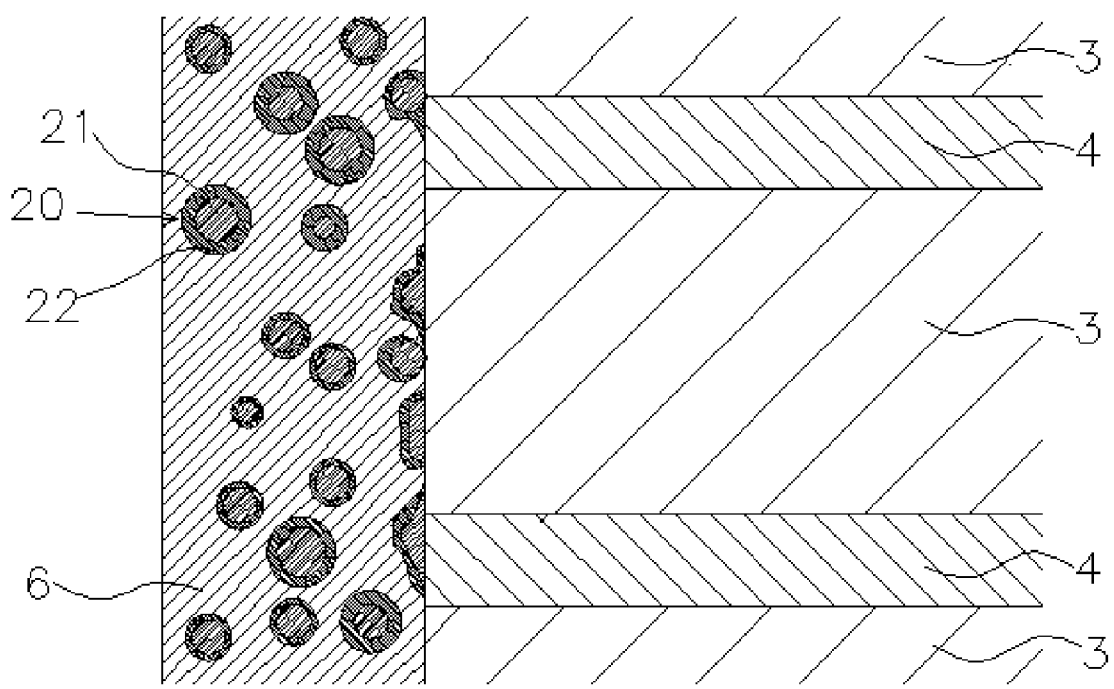
FIG. 2 is a fragmentary enlarged view of a first plating layer shown in FIG. 1.
Figure 3:
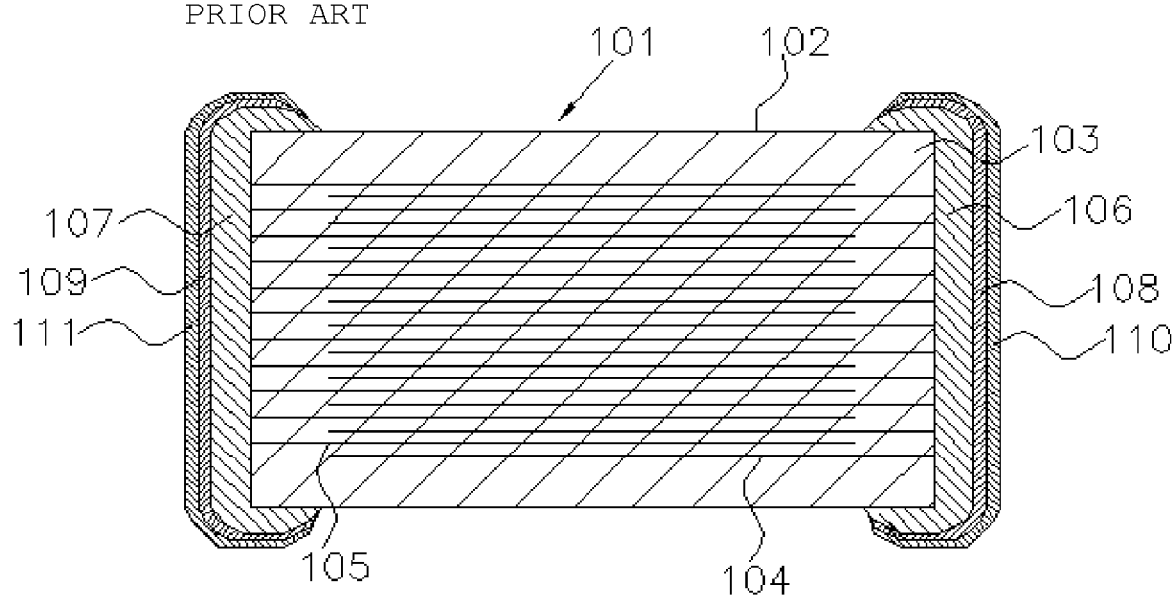
FIG. 3 is a sectional view of a known monolithic ceramic capacitor.

FIG. 2 is a fragmentary enlarged view of the first plating layer 6, showing the portion where the first plating layer 6 is formed over a surface of the multilayer composite 2 at which the internal electrodes are exposed. In FIG. 2, the second plating layer 8 and the third plating layer 10 are omitted.

As shown in FIG. 2, each glass particle 21 is coated with a metal film 22 to form a metal-coated glass particle 20, and the metal-coated glass particles 20 are dispersed in the first plating layer 6. The metal film 22 coats substantially the entire surface of the glass particle 21. The glass particles 21 may be fluidized by heat treatment, and, thus, the substantially spherical shape of the glass particles may be changed into another. Heat treatment may cause the metal films 22 to diffuse into the first plating layer 6.

At least some of the metal-coated glass particles 20 are stuck to the dielectric ceramic layers 3, thereby enhancing the adhesion of the first plating layer 6 to the ceramic body. Furthermore, the glass component of the glass particles may fill the interfaces between the dielectric ceramic layers 3 and the internal electrode layers 4 to prevent the permeation of liquid, such as a plating solution, effectively.

Any type of glass particles 21 can be used for the metal-coated glass particles 20 without particular limitation, and, for example, B—Si-based glass particles may be used. Examples of B—Si-based glass include B—Si—Bi, B—Si-alkali metal, B—Si-alkali metal-(Ti,Zr), B—Si-alkaline-earth metal, B—Si-alkali metal-alkaline-earth metal, B—Si—Zn-alkali metal, and B—Si—Zn-alkaline-earth metal glasses. The particle size of the glass particles 21 is preferably about 0.01 μm to about 7 μm, for example, from the viewpoint of the bonding property during heat treatment. The glass particle content in the first plating layer 6 is preferably about 0.1% to about 20% by volume, for example.

The main constituent of the metal film 22 coating the glass particles is not particularly limited, but is preferably a metal of the same type as the plating metal or an electrochemically noble metal. Such constituents can prevent a substitution reaction between the metal of the metal film 22 and the plating metal in the plating bath. If Cu is used as the plating metal, the metal film 22 coating the glass particle 21 is suitably made of Cu, Ag, Pd, Au, or Pt, and Ni can be suitable, depending on the constituents of the plating bath. If Ni is used as the plating metal, Sn can be used for the metal film 22 in addition to those metals.

Preferably, the metal film 22 is formed to a thickness of about 0.05 µm to about 2 µm, for example, from the viewpoint of sufficiently coating the glass particles with a diameter as small as possible.

A method for manufacturing a ceramic electronic component according to another preferred embodiment of the present invention will now be described with reference to the monolithic ceramic capacitor shown in FIG. 1.

In the multilayer composite 2 before plating, the exposed internal electrodes 4 (or 5) are electrically isolated from one another. First, the plating metal is deposited on the exposed portions of the internal electrodes 4 (and 5). The deposits on the exposed portions are each further grown so as to join with the adjacent deposits. This process is continued until the entire surface at which the internal electrodes 4 (or 5) are exposed is covered with a layer of the deposits, thereby forming a dense and uniform first plating layer 6 (or 7) directly on the internal electrode-exposing surface.

The plating layer of the present preferred embodiment is formed by the growing force of the plating deposit and its high malleability. If the dielectric ceramic layers 3 have a thickness of about 10 µm or less, the plating layer is preferably formed by electrolytic plating; if the dielectric ceramic layers 3 have a thickness of about 20 µm or less, the plating layer is preferably formed by electroless plating. These conditions facilitate joining the grown plating deposits together.

If the internal electrodes 4 (and 5) are slightly recessed from the internal electrode-exposing surface, the depth of the recesses is preferably about 1 µm or less, for example. If the recess has a depth of more than about 1 µm, electrons are not easily supplied to the exposed portions of the internal electrodes 4 (and 5), and consequently the plating metal is not easily deposited. In order to reduce the depth of the recess, the surface can be ground by sandblasting or barreling.

Preferably, the internal electrodes 4 (and 5) protrude from the internal electrode-exposing surface before plating. Although this is achieved by appropriately controlling the grinding conditions (for example, sandblasting conditions), the protruding portions of the internal electrodes 4 (and 5) are drawn in the direction parallel to the plated surface by the grinding. Consequently, the plating deposits on the ends of the internal electrodes are hindered from growing to join with the adjacent plating deposits. In order to easily join the grown plating deposits with each other, in this instance, the thickness of the dielectric ceramic layers 3 is preferably about 20 µm or less for electrolytic plating, or the thickness of the dielectric ceramic layers 3 is preferably about 50 µm or less for electroless plating, for example.

After forming the first plating layers 6 and 7, the second plating layers 8 and 9 and the third plating layers 10 and 11 can easily be formed respectively by conventional plating processes.

The plating processes applied in the present preferred embodiment will now be described in detail.

For electroplating, the multilayer composite before forming the external electrodes and an electroconductive medium are placed in, for example, a vessel equipped with power supply terminals. The vessel is immersed in a plating bath containing metal ions or a metal complex, and a current is applied to the vessel that is rotated, swung, or vibrated. If a multilayer composite is plated, deposition can be started at the exposed ends of the internal electrodes. If the surface to be plated is made of only ceramic, some surface treatment is required. For example, metal fine particles are preferably attached to the surface.

For electroless plating, the plating metal is deposited using a reducing agent in the plating bath. In this instance, a catalyst is required to promote the function of the reducing agent. If a multilayer composite is plated, the exposed ends of the internal electrodes may be used as the core of the catalyst. If the internal electrodes cannot function as a catalyst, or if the plated surface is made of only ceramic, the plated surface requires treatment for attaching a catalyst or the use of a stirring medium made of a metal functioning as a catalyst.

In order to form a plating layer in which the metal-coated glass particles 20 are dispersed, the metal-coated glass particles 20 can be dispersed in the plating bath to be used. As the plating metal is deposited, the metal-coated glass particles are co-deposited with the plating metal. At this time, the metal film 22 coating the glass particle 21 helps the plating layer 6 adsorb the glass particle 21. This results in easy control of the content and the degree of dispersion of the glass particles 21 in the plating layer. In addition, the metal film 22 coating the glass particle 21 prevents the glass particle 21 from melting and being lost in the plating bath.

In order to disperse the metal-coated glass particles 20 reliably in the plating bath, the plating bath may be properly stirred. The glass particle concentration in the plating bath is preferably about 0.5 g/L to about 50 g/L, for example. Any process can be applied to coat the glass particles 21 with the metal film 22 as long as the advantages of the preferred embodiments of the present invention can be achieved. For example, sputtering, vapor deposition, or electroless plating can be applied.

After the formation of the plating layer containing the metal-coated glass particles 20, the resulting plating layer is heat-treated at a temperature of equal to or more than the softening point of the glass particles, so that the glass particles in the plating layer is moved toward the multilayer composite and solidified. Thus, the adhesion of the first plating layers 6 and 7 to the multilayer composite is enhanced. In this instance, blisters are hardly produced by the heat treatment.

If the ceramic electronic component according to a preferred embodiment of the present invention is a monolithic type as shown in FIG. 1, the external electrode of the ceramic electronic component substantially includes only plating layers. However, a paste electrode may be used in a portion not directly involved in the connection of the internal electrodes. For example, if the external electrode extends to the surfaces adjacent to the internal electrode-exposing surface, a thick paste electrode may be formed for such an extension. The thick paste electrode facilitates solder mounting and prevents the permeation of moisture from the ends of the plating layer effectively.

While monolithic ceramic capacitors are known as a typical type of ceramic electronic components, the ceramic electronic component of preferred embodiments of the present invention may be a chip inductor, a chip thermistor, or the like. Hence, any ceramic may be used as long as the ceramic layers are electrically isolated from each other. For example, a piezoelectric ceramic, a semiconductor ceramic, and a magnetic ceramic may be used without limiting to dielectric ceramics, and the ceramic may contain a resin. The technique of the present preferred embodiment may be applied to simple ceramic electronic components not including internal electrodes without limiting to the electronic component having a multilayer structure.

While the monolithic ceramic capacitor shown in FIG. 1 preferably has a pair of external electrodes, a plurality of pairs of external electrodes (arrayed type) may be provided.

EXAMPLES

Examples of the ceramic electronic component and the method for manufacturing the same according to the above-described preferred embodiments of the present invention will now be described.

Example 1

A multilayer composite of 1.0 mm in length by 0.5 mm in width by 0.5 mm in thickness was prepared for a monolithic ceramic capacitor, and on which plating layers were formed. The dielectric ceramic layers were made of a barium titanate-based dielectric material, and the internal electrodes were essentially made of Ni. Each dielectric ceramic layer between two adjacent internal electrodes had a thickness of about 2 μm, and each internal electrode layer had a thickness of about 1 μm.

After being dried, the multilayer composite was subjected to sandblasting with an abrasive so that the height of the protrusions of the internal electrodes from the internal electrode-exposing surfaces was about 1 μm on average.

Then, a B—Si glass powder having a softening point of about 600° C. and an average particle size of 1.1 μm was prepared. The glass powder was subjected to sputtering to give electroconductivity to the surfaces of the powder particles. The powder particles were subsequently coated with a Ni film in a Watts solution less corrosive to glass. The Ni-coated glass powder was heat-treated in a non-oxidizing atmosphere at 550° C. to vaporize the moisture on the glass particles and to densify the Ni film. The resulting Ni films had an average thickness of 0.2 μm.

The Ni-coated glass particles were added to a pyrophosphate electrolytic plating bath containing pyrozole produced by Meltex to a concentration of 10 g/L, and were dispersed by stirring at a bath temperature of 58° C. and a pH of 8.7.

Then, 30 mL of multilayer composites and 70 mL of solder balls having a diameter of 0.7 mm were placed in a 300 mL rotation barrel.

The rotation barrel was immersed in the plating bath and a current of 10 A was applied with the barrel rotated at 20 rpm. Cu plating layers containing Ni-coated glass particles were thus formed to a thickness of 5 μm on the internal electrode-exposing surfaces of the multilayer composite.

After being taken out from the rotation barrel, the multilayer composites were heated to a temperature of 700° C. at a rate of 5° C./min in a nitrogen atmosphere and allowed to stand at that temperature for 10 minutes.

The multilayer composites having the Cu plating layers were placed in the rotation barrel again. The barrel was immersed in a Ni plating Watts bath having a pH adjusted to 4.2 and a temperature of 60° C., and a current of 10 A was applied with the barrel rotated at 20 rpm. A 3.0 μm thick Ni plating layer was thus formed on each Cu plating layer.

Furthermore, the multilayer composites on which the Ni plating layers had been formed were placed in the rotation barrel. The barrel was immersed in a Sn plating bath (Sn-235 produced by Dipsol chemicals) having a pH adjusted to 5.0 and a temperature of 33° C., and a current of 6 A was applied with the barrel rotated at 20 rpm. A 3.0 μm thick Sn plating layer was thus formed on each Ni plating layer.

Thus, monolithic ceramic capacitors were completed and included a multilayer composite having external electrodes composed of only plating layers, not including paste electrode layers.

The surfaces of the external electrodes of 100 monolithic ceramic capacitors sampled from the monolithic ceramic capacitors prepared above were observed through an optical microscope. Blisters were not observed in any of the samples.

The monolithic ceramic capacitor was mounted on an epoxy substrate with solder. A stress was applied to the center of a side surface (the visible side in FIG. 1) of the monolithic ceramic capacitor in the direction parallel to the surface of the substrate (in the direction perpendicular to the sheet of the figure), and the stress at which the external electrode peeled off was defined as the adhesion of the external electrode. The adhesions of 10 samples were averaged, and were as sufficient as 80N.

Example 2

The same multilayer composite and the same glass particles as in Example 1 were prepared. The glass particles were coated with Ni films in the same manner as in Example 1.

The Ni-coated glass particles were added to an electroless Cu plating bath containing OPC Copper T produced by Okuno Chemical Industries to a concentration of 30 g/L, and were dispersed by stirring at a bath temperature of 40° C. and a pH of 12.

Then, 30 mL of multilayer composites and 70 mL of Cu-coated solder balls having a diameter of 0.7 mm were placed in a 300 mL rotation barrel.

The rotation barrel was immersed in the plating bath and rotated at 12 rpm. As a result, Cu plating layers containing the glass particles were formed to a thickness of 5 μm on the internal electrode-exposing surfaces of the multilayer composites.

After being taken out from the rotation barrel, the multilayer composites were heated to a temperature of 700° C. at a rate of 5° C./min in a nitrogen atmosphere and allowed to stand at that temperature for 10 minutes.

Then, Ni plating layers and Sn plating layers were formed on the multilayer composite on which the Cu plating layers had been formed, as described above. Thus, monolithic ceramic capacitors having external electrodes composed of plating layers were completed.

The surfaces of the external electrodes of 100 monolithic ceramic capacitors sampled from the monolithic ceramic capacitors prepared above were observed through an optical microscope. Blisters were not observed in any of the samples.

The adhesions of the external electrodes were measured in the same manner as in Example 1. The average adhesion of 10 samples was 80 N.

Comparative Example

The same multilayer composites and the same glass particles as in Example 2 were prepared.

Cu plating layers were formed on the multilayer composites by electroless plating in the same manner as in Example 2, except that the glass particles were not coated with a metal film.

After the formation of the Cu plating layers, the multilayer composite was subjected to heat treatment under the same conditions as in Example 2, and subsequently Ni plating layers and Sn plating layers were formed in the same manner as in Example 1. Thus, monolithic ceramic capacitors having external electrodes composed of plating layers were completed.

The surfaces of the external electrodes of 100 monolithic ceramic capacitors sampled from the prepared monolithic ceramic capacitors were observed through an optical microscope. Blisters were observed in all the samples.

The adhesions of the external electrodes were measured in the same manner as in Example 1. The average adhesion of 10 samples was 60 N.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A ceramic electronic component comprising:
a ceramic body; and
a plurality of external electrodes each located on a surface of the ceramic body; wherein
at least one of the external electrodes includes a plating layer containing glass particles each coated with a metal film.

2. The ceramic electronic component according to claim 1, wherein the ceramic body is a multilayer composite including a stack of a plurality of ceramic layers, and a plurality of internal electrode layers extending respectively along interfaces between the ceramic layers and exposed at a surface of the multilayer composite, and the plating layer of the external electrode electrically connects the internal electrode layers to each other at the surface at which the internal electrode layers are exposed.

3. The ceramic electronic component according to claim 1, wherein the plating layer essentially contains Cu, and the metal film essentially contains Ni.

4. A method for manufacturing a ceramic electronic component, comprising the steps of:
preparing a ceramic body;
preparing metal-coated glass particles, each including a glass particle and a metal film coating the glass particle;
preparing a plating bath containing a plating metal and the metal-coated glass particles, the metal-coated glass particles being dispersed in the plating bath; and
forming a plating layer containing the metal-coated glass particles on the ceramic body in the plating bath.

5. The method according to claim 4, wherein the ceramic body is a multilayer composite including a stack of a plurality of ceramic layers and a plurality of internal electrode layers extending respectively along interfaces between the ceramic layers and each having an end exposed at a surface of the multilayer composite, and in the step of forming the plating layer, the exposed ends of the internal electrode layers are respectively plated to deposit the plating metal in the plating bath, and the deposits of the plating metal on the ends of the internal electrodes are grown so as to be joined to each other, thereby forming the continuous plating layer.

6. The method according to claim 4, further comprising the step of heat-treating the ceramic body at a temperature equal to or more than the softening point of the glass particles after forming the plating layer.

* * * * *